US012760697B2

(12) United States Patent
Mueller

(10) Patent No.: US 12,760,697 B2
(45) **Date of Patent: *Oct. 13, 2026**

(54) GAS INJECTOR HAVING REDUCED WEAR AND DAMPING DEVICE

(71) Applicant: Robert Bosch GmbH, Stuttgart (DE)

(72) Inventor: Martin Mueller, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 379 days.

This patent is subject to a terminal disclaimer.

(21) Appl. No.: 18/262,606

(22) PCT Filed: Dec. 13, 2021

(86) PCT No.: PCT/EP2021/085484

§ 371 (c)(1),
(2) Date: Jul. 24, 2023

(87) PCT Pub. No.: WO2022/161688

PCT Pub. Date: Aug. 4, 2022

(65) Prior Publication Data

US 2024/0301846 A1 Sep. 12, 2024

(30) Foreign Application Priority Data

Jan. 27, 2021 (DE) ..................... 10 2021 200 689.2

(51) Int. Cl.
*F02M 21/02* (2006.01)
*F02M 51/06* (2006.01)

(52) U.S. Cl.
CPC .... *F02M 21/0254* (2013.01); *F02M 21/0257* (2013.01); *F02M 51/0671* (2013.01)

(58) Field of Classification Search
CPC ........... F02M 21/0254; F02M 21/0257; F02M 21/0269; F02M 21/0275; F02M 51/0671; F02M 51/0675; F02M 2200/304
See application file for complete search history.

(56) References Cited

U.S. PATENT DOCUMENTS 4,725,002 A 2/1988 Trachte
6,311,950 B1 * 11/2001 Kappel .............. F02M 51/0603 251/282

(Continued)

FOREIGN PATENT DOCUMENTS

DE 102013206962 A1 11/2014
DE 102014212549 A1 12/2015

(Continued)

OTHER PUBLICATIONS

International Search Report for PCT/EP2021/085484, Issued May 3, 2022.

*Primary Examiner* — Darren W Gorman
(74) *Attorney, Agent, or Firm* — Norton Rose Fulbright US LLP

(57) ABSTRACT

A gas injector for injecting a gaseous fuel. The gas injector includes a solenoid actuator including an armature, an internal pole, and a coil; a closure element which opens and closes a gas path on a valve seat, the armature being connected to the closure element; a closed lubricant chamber filled with a lubricant and in which the armature is arranged, the lubricant ensuring the armature is lubricated; a flexible sealing element sealing the lubricant chamber in relation to the gas path, and a braking device which is arranged in the lubricant chamber and is configured to brake the closure element during a process of restoring the gas injector from the open into the closed state. The braking device has a brake pin, a damping chamber that is filled with lubricant and is in fluid communication with the lubricant chamber, and a resilient brake element.

9 Claims, 2 Drawing Sheets

(56) References Cited

U.S. PATENT DOCUMENTS

| | | | | |
|---|---|---|---|---|
| 6,422,488 | B1 * | 7/2002 | Fochtman | F02M 51/0664<br>239/585.5 |
| 6,575,138 | B2 * | 6/2003 | Welch | F02M 61/10<br>123/498 |
| 7,040,550 | B2 * | 5/2006 | Hohl | F02M 61/167<br>239/533.8 |
| 7,117,849 | B1 * | 10/2006 | Reatherford | F02M 21/0275<br>239/132.3 |
| 9,797,342 | B2 | 10/2017 | Shafer et al. | |
| 2004/0036048 | A1 | 2/2004 | Petersen | |
| 2017/0101965 | A1 * | 4/2017 | Grandi | F02M 21/0275 |
| 2017/0101966 | A1 * | 4/2017 | Filippi | F02M 51/0607 |
| 2019/0017476 | A1 * | 1/2019 | Kurz | F02M 51/0664 |

FOREIGN PATENT DOCUMENTS

| | | | | |
|---|---|---|---|---|
| DE | 102008041544 | B4 | 5/2016 | |
| EP | 0425327 | A1 * | 5/1991 | F02M 63/0001 |
| JP | 2010539379 | A | 12/2010 | |
| WO | 2017207134 | A1 | 12/2017 | |
| WO | 2022002454 | A1 | 1/2022 | |

* cited by examiner

GAS INJECTOR HAVING REDUCED WEAR AND DAMPING DEVICE

FIELD

The present invention relates to a gas injector for injecting a gaseous fuel, in particular hydrogen or natural gas or the like, having reduced wear and improved damping behavior, in particular for internal combustion engines. More particularly, the gas injector is configured for direct injection into a combustion chamber of an internal combustion engine.

BACKGROUND INFORMATION

Gas injectors are described in the related art in various configurations. An inherent problem in gas injectors is that because a gaseous injection medium is used, the medium cannot provide any lubrication, unlike, for example, in fuel injectors that inject gasoline or diesel. This results in excessive wear during operation in comparison with fuel injectors for liquid fuels. In this context, having a gas injector that has improved wear behavior would be desirable.

SUMMARY

An advantage of the gas injector according to the present invention for injecting a gaseous fuel is that wear on the gas injector can be significantly reduced. As a result, the service life of the gas injector may be prolonged and may correspond substantially to the service life of a fuel injector for liquid fuels. In addition, during closure of the gas valve, a closure element can perform a closing process that is damped to a much better extent, so wear on the valve seat and on other components of the closure element is reduced or prevented. According to an example embodiment of the present invention, this may be achieved in that the gas injector has a lubricant located in a closed lubricant chamber in which moving parts of the gas injector are arranged. The gas injector comprises a solenoid actuator having an armature, an internal pole, and a coil. In this case, the armature, which is mechanically connected to a closure element that opens and closes a gas path on a valve seat, is provided for enabling a movement for opening and/or closing the injector. The armature, which is located in the lubricant chamber and pulled toward the internal pole of the solenoid actuator owing to electromagnetic forces when current is applied to the coil, is thus located in the interior of the lubricant chamber and is constantly supplied with lubricant and lubricated. This significantly reduces wear on the armature in comparison with conventional gas injectors from the prior art. To ensure the lubricant chamber is sealed, a flexible sealing element is provided, which seals the lubricant chamber at one portion. In addition, using the closed lubricant chamber filled with lubricant significantly prolongs the service life of the gas injector. Preferably, the lubricant chamber is entirely filled with lubricant.

According to an example embodiment of the present invention, the gas injector further comprises a braking device which is arranged in the lubricant chamber and is configured to brake the closure element during a process of restoring the gas injector from the open into the closed state. The braking device comprises a brake pin, a damping chamber which is in fluid communication with the lubricant chamber, and a resilient brake element, in particular a spring. The brake pin and the resilient brake element are operatively connected to the closure element and/or to the armature during the restoring process, the brake pin furthermore being configured, during the restoring process, to displace lubricant out of the damping chamber in order to damp the restoring of the brake pin and thus the restoring of the closure element. Since part of the braking process is provided by hydraulic adhesion between the brake pin and a stop component which the brake pin abuts when the gas injector is in the open state, providing the damping chamber can prevent vapor bubbles from forming in the liquid lubricant when overcoming the hydraulic adhesion, and so wear by cavitation in particular can be prevented.

This is additionally assisted by the acceleration of the additional masses, which is provided by the braking device. Moreover, further braking is achieved by the displacement of the lubricant between the armature and the brake pin. Rubbing of guide elements or the like on the brake pin can also further reduce the restoring speed of the closure element. All this reduces the impact force of the armature on the stop, and so the service life of the armature can be prolonged further.

Preferred developments and example embodiments of the present invention are disclosed herein.

More preferably, according to an example embodiment of the present invention, the brake pin comprises in particular a main body having a contact surface, which is arranged on a side of the main body of the brake pin pointing toward the closure element, can be operatively connected to the closure element, and is used as a stop surface. The main body is preferably cylindrical. More preferably, an annular flange is arranged on the side of the main body pointing toward the closure element. The annular flange is preferably used as the stop surface.

According to a further preferred embodiment of the present invention, the resilient brake element of the braking device is arranged in the damping chamber. As a result, a particularly compact construction can be implemented. The resilient brake element is preferably a compression spring, in particular a cylinder spring.

More preferably, according to an example embodiment of the present invention, the damping chamber is in fluid communication with the lubricant chamber by way of a guide play of the brake pin.

Preferably, according to an example embodiment of the present invention, the gas injector further comprises a choke which connects the damping chamber to the lubricant chamber. The choke ensures that the damping process can take place in a defined manner since the lubricant is transferred out of the damping chamber then into the lubricant chamber via the choke. The choke is preferably a small connecting hole between the damping chamber and the lubricant chamber. The damping behavior of the braking device can be adjusted by selecting geometric dimensions of the connecting hole, for example the diameter and/or length of the hole.

More preferably, according to an example embodiment of the present invention, the gas injector comprises an armature pin which abuts the closure element, the armature pin being connected to the armature. An end of the armature pin facing away from a seal seat of the gas injector is configured to come into contact with the brake pin when the gas injector is in the closed state. The closure element is preferably a valve needle. Alternatively, the closure element and the armature pin are preferably rigidly interconnected, particularly preferably by way of a spring disk.

Furthermore, according to an example embodiment of the present invention, the gas injector preferably comprises an armature pin guide in which the armature pin is guided. In this case, the armature pin guide forms a stop for the brake pin when the gas injector is in the open state. In the closed state, there is a small gap between the armature pin guide and the brake pin. During opening, this small gap is overcome by the compressive force of the spring of the braking device acting on the brake pin.

According to a further preferred embodiment of the present invention, the gas injector comprises a guide member arranged in the lubricant chamber and having a guide region for guiding the brake pin. Preferably, the guide member has a cut-out, in particular at an end of the guide member pointing toward the seal seat, in which cut-out the brake pin is guided.

Preferably, according to an example embodiment of the present invention, when the gas injector is in the closed state, a first gap between the brake pin and the armature pin guide has a first width B that is smaller than a second gap having a second width C between the armature and the internal pole. In this case, the axial gap B between the armature pin guide and the brake pin is preferably in a range from 1% to 90% of the axial gap C between the armature and the internal pole. Particularly preferably, the axial gap B between the armature pin guide and the brake pin is less than 25% of the axial gap C; more preferably, it is in a range from 3% to 20% of the axial gap C. The axial gap C preferably measures from 0.05 mm to 3 mm, in particular 0.8 mm. Alternatively, according to an example embodiment of the present invention, the first and second flexible sealing elements each have a membrane or each have a rubber element. The membrane may be single-layer or multi-layer and, for example, be secured to the relevant components for sealing the lubricant chamber using laser welding.

Preferably, according to an example embodiment of the present invention, the flexible sealing element of the lubricant chamber comprises one first and one second flexible sealing element. Particularly preferably, the two sealing elements are bellows. The lubricant chamber is thus sealed by two flexible sealing elements, as a result of which, when the lubricant in the lubricant chamber is displaced, the occurrence of unfavorable excess pressure or negative pressure can be prevented, which may exert an undesirable force on the closure element of the gas injector by way of, for example, components of the lubricant store. By providing two flexible sealing elements, balancing can be provided by the second flexible sealing element even when an unfavorable force is exerted on one of the sealing elements, which could lead to a pressure increase in the closed lubricant chamber. Thus, an undesirable pressure change in the interior of the closed lubricant chamber can be successfully prevented.

More preferably, according to an example embodiment of the present invention, the preloaded spring exerts a predetermined force on the lubricant in the closed lubricant chamber from the exterior. Preferably in this case, excess pressure of between 0.5 and $10\times10^5$ Pa, particularly preferably of 1 to $5\times10^5$ Pa, is exerted. Thus, the lubricant in the lubricant chamber can be placed under a predetermined preload, as a result of which undesirable deformations that could have an impact on a stroke of the closure element can be reliably prevented.

Particularly preferably, according to an example embodiment of the present invention, the first flexible sealing element is a first bellows, and the second flexible sealing element is a second bellows. More preferably, the first and second bellows are identical, i.e., they have the same average bellows diameter and the same number of bellows convolutions. As a result, particularly the production costs of the gas injector can be reduced.

More preferably, according to an example embodiment of the present invention, the second bellows is connected to the preloaded spring via a spring disk. A simple and cost-effective construction can thus be implemented. Furthermore, a certain preload can thus be exerted directly on the second bellows by way of the preloaded spring, whereby the rigidity of the second bellows is increased slightly compared with the first bellows.

According to a further preferred embodiment of the present invention, the gas injector further comprises a first and a second closure element guide. In this case, the first and second closure element guides are preferably both arranged in the lubricant chamber. Preferably, the closure element only has the two first and second closure element guides, and so all the guide elements for the closure element are arranged in the interior of the lubricant chamber filled with lubricant. This ensures lubrication of all the important components of the gas injector in the interior of the lubricant chamber. In practice, therefore, the service life of the gas injector can correspond to that of an injector for liquid fuels.

Preferably, an oil, in particular mineral oil, is used as the lubricant. Alternatively, a liquid fuel, in particular diesel or gasoline, is used. As a further alternative, a grease, a polyalphaolefin (PAO) oil, an ester oil, or a polyglycol oil is used as the lubricant.

More preferably, according to an example embodiment of the present invention, the first and second flexible sealing elements each have a single-layer or multi-layer bellows. The bellows is preferably made of metal or alternatively of a plastics material. The first bellows is preferably secured by a first end directly to the closure element and by the other end to a housing component of the gas injector. In metal bellows, for example, the securing can be accomplished by way of a welded joint.

Preferably, according to an example embodiment of the present invention, a gas path of the gaseous fuel is provided in a region between a valve housing of the gas injector and an actuator housing of the gas injector. As a result, the actuator can be arranged in a housing and can be preassembled at least in part as an assembly. The lubricant chamber can thus also be arranged in the interior of the actuator housing in a relatively simple manner.

Alternatively, the gas path of the gaseous fuel is formed by a region of the solenoid actuator, in particular by the coil chamber in which the coil of the solenoid actuator is arranged. A separate actuator housing for the solenoid actuator can thus be omitted. Particularly preferably, an electrical contact is then guided through the gas path of the gaseous fuel. As a result, in particular the complexity of the construction of the gas injector can be reduced. It should be noted that the electrical contact guided through the gas chamber of course has to be sealed from the exterior.

More preferably, according to an example embodiment of the present invention, a filter is arranged in the gas path for the gaseous fuel in order to filter out any solids particles present in the gaseous fuel or to filter out any production-related or assembly-related solids particles. More preferably, a guide component is also provided on the closure element, in particular when the closure element is a long valve needle.

According to an example embodiment of the present invention, the gas injector is preferably an injector that opens outward. More preferably, the gas injector is compressive force-balanced. The force for opening the gas injector using the solenoid actuator is thus independent of the gas pressure. The time needed for opening and closing the injector after current begins to be applied and after the current supply is stopped, respectively, is thus also independent of the gas pressure. In turn, this allows for operation at various gas pressures. The gas pressure can be reduced when the injection volume is intended to be low, and the gas pressure can be increased when the injection volume is intended to be high. The injector is compressive force-balanced when the average diameter of the bellows is equal to the diameter of the seat contact line between the closure element and the valve body. However, the average bellows diameter can also be configured to be smaller or larger than the seat diameter. In the first case, the overall closure force on the valve needle is reduced at relatively high gas pressures, and the injector opens more quickly when current is applied and closes more slowly after the current supply is stopped. This results in a greater gas injection volume. In the second case, the closure force on the valve needle is increased at relatively high gas pressures. In turn, this can compensate for an increase in the seat leakage volume owing to the higher gas pressure.

Preferably, according to an example embodiment of the present invention, restoring is carried out by way of a restoring spring. In a pressure-balanced injector, when the gas injector is in the closed state there is in particular no compressive force on the valve needle from the gaseous fuel, and so the load on the closure element can be significantly reduced.

BRIEF DESCRIPTION OF THE DRAWINGS

Hereinafter, exemplary embodiments of the present invention will be described in detail with reference to the figures.

DETAILED DESCRIPTION OF EXAMPLE EMBODIMENTS

Hereinafter, a gas injector 1 according to a first preferred exemplary embodiment of the present invention will be described in detail with reference to FIGS. 1 and 2.

Figure 1:
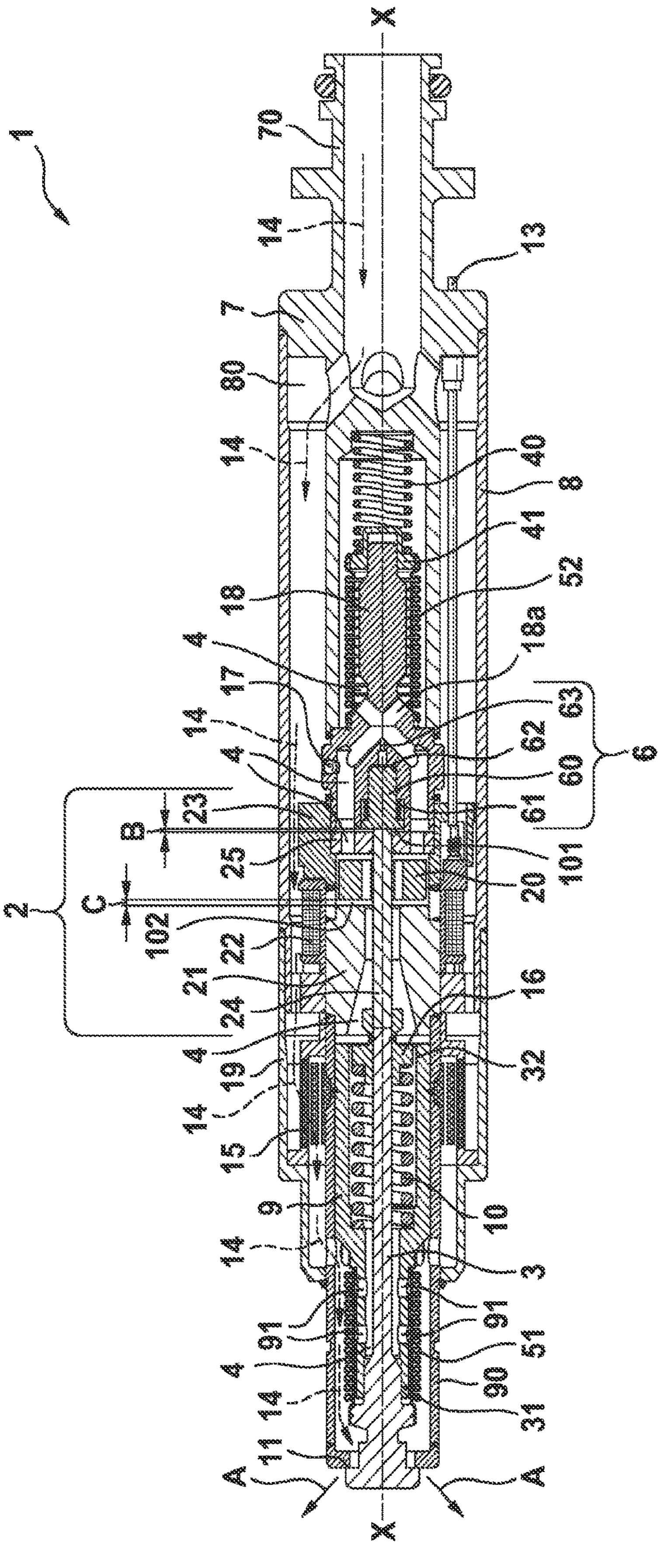
FIG. 1 is a schematic sectional view of a gas injector according to a first exemplary embodiment of the present invention.

As can be seen from FIG. 1, the gas injector 1 for introducing a gaseous fuel comprises a solenoid actuator 2 which moves a closure element 3 (in this exemplary embodiment a valve needle that opens outward) from a closed state into an open state. In this regard, FIG. 1 shows the closed state of the gas injector.

The solenoid actuator 2 comprises an armature 20 which abuts the closure element 3 by way of an armature pin 24. Furthermore, the solenoid actuator 2 comprises an internal pole 21, a coil 22, and a magnet housing 23 which ensures a magnetic return of the solenoid actuator.

Moreover, the gas injector 1 comprises a main body 7 having a connection tube 70 through which the gaseous fuel is supplied. In this case, a valve housing 8 in which the solenoid actuator 2 is arranged is secured to the main body 7. Adjoining the valve housing 8 is a housing sleeve 19 and a valve tube 90, on the free end of which there is provided a valve seat 11 at which the closure element 3 opens and closes a passage for the gaseous fuel.

FIG. 1 schematically shows an electrical terminal 13 which is guided through the main body 7 as far as the solenoid actuator 2.

Reference numeral 10 denotes a restoring element for the closure element 3 for restoring said closure element back into the closed state shown in FIG. 1 after an opening process.

FIG. 1 further shows a gas stream as a gas path 14 through the gas injector 1. The gas stream begins at the connection tube 70 and is then diverted into an annular chamber 80 between the valve housing 8 and the main body 7. In the process, the gas stream 14 proceeds past an external region of the solenoid actuator 2, through a filter 15, before reaching a position upstream of the valve seat 11. In this case, openings are accordingly provided in the relevant components, not all of which are shown in FIG. 1.

When the gas injector 1 is opened, the gaseous fuel then flows past the external circumference of the solenoid actuator 2 and past the open valve seat 11 into a combustion chamber of an internal combustion engine, as indicated by the arrows A in FIG. 1.

The closure element 3 thus opens and closes the gas path 14 at the valve seat 11. For the guidance, a first guide region 31 and a second guide region 32 are provided between the closure element 3 and a valve body 9, as can be seen in detail from FIG. 1. The first guide region 31 is formed close to the valve seat, directly between the closure element 3 and the valve body 9. The second guide region 32 is formed between a spring disk 16 and the valve body 9. The spring disk 16 is rigidly connected to the closure element 3, the restoring element 10 being supported between the valve body 9 and the spring disk 16.

In addition, the gas injector 1 comprises a closed lubricant chamber 4. The closed lubricant chamber 4 is filled either entirely or in part with a liquid lubricant, e.g., oil.

As can be seen from FIG. 1, the lubricant chamber 4 is delimited by a first flexible sealing element 51, the internal pole 21, the magnet housing 23, a guide member 18, and a second flexible sealing element 52. The first and second flexible sealing elements 51, 52 are each formed as bellows. In this case, the first and second flexible sealing elements 51, 52 are identical.

It should be noted that, for example, a membrane, a hose, or the like can be provided as the flexible sealing elements 51, 52 instead of a bellows.

As can also be seen from FIG. 1, the second flexible sealing element 52 is secured to a preloaded spring disk 41, for example by way of a welded joint. Furthermore, the gas injector 1 comprises a preloaded compression spring 40 which is supported on the main body 7 and preloads the second flexible sealing element 52 via the preloaded spring disk 41. Connecting holes 18*a* are provided in the guide member 18 such that the lubricant located in the lubricant chamber 4 is also located in the region inside the second flexible sealing element 52.

The first flexible sealing element 51 is secured directly to the closure element 3 and connected to the valve body 9 at the other end. In the process, cross-holes 91 are provided in the valve body 9 such that there is fluid communication between the inner chamber of the first flexible sealing element 51 and the inner chamber of the valve body 9.

Thus, the lubricant chamber 4 has two flexible sealing elements 51, 52 and the preloaded compression spring 40. The preloaded compression spring 40 exerts a certain preload, for example $1\times10^5$ Pa, on the lubricant located in the lubricant chamber 4. If, during an opening process, the lubricant is then displaced by the stroke of the closure element 3 or even by the heat expansion or cooling of the lubricant, any excess pressure/negative pressure occurring in the interior of the lubricant chamber 4 can be compensated for by deflection at the second flexible sealing element 52 in conjunction with a contraction of the preloaded compression spring 40. The flexible sealing element 51 can thus prevent an undesirable force, acting via the active surface of the bellows, from being exerted on the closure element 3.

The armature pin 24 having the armature 20 secured thereto is arranged in the closed lubricant chamber 4. Since the lubricant chamber 4 is filled with a lubricant, for example a liquid fuel such as gasoline or diesel, or a grease or the like, the armature 20 is continually lubricated. Thus, it is possible to compensate for the problem occurring with gaseous fuels in the prior art where the moving parts are inadequately lubricated.

As can be seen from FIG. 1, a filling duct 17*a* is provided for filling the closed lubricant chamber 4. The filling duct 17*a* is sealed in a fluid-tight manner using a locking ball 17.

Furthermore, a braking device 6 is arranged in the closed lubricant chamber 4. The braking device 6 comprises a brake pin 60, a damping chamber 62 filled with lubricant, and a resilient brake element 61. The damping chamber 62 is in fluid communication with the lubricant chamber 4.

The brake pin 60 and the resilient brake element 61 are operatively connected to the closure element 3 during a process of restoring the gas injector into the closed starting position. During the restoring process, lubricant is displaced out of the damping chamber 62 and into the lubricant chamber 4 in order to achieve additional damping when the brake pin 60 is restored into the closed state of the gas injector (FIG. 1).

In this case, the brake pin 60 is guided in the guide member 18. As can also be seen from FIG. 1, the damping chamber 62 is formed directly on the brake pin 60 on a side of the brake pin 60 facing away from the valve seat 11. This can be seen in detail from FIG. 2. The damping chamber 62 is connected to the connecting holes 18*a*, and thus to the main region of the lubricant chamber 4, by way of a choke 63, which is a small hole. The brake spring 61 is arranged in a spring chamber 67.

The brake pin 60 has a contact surface 60*a* that is in contact with the armature pin 24. In the closed state as shown in FIG. 2, there is a first gap 101 between the brake pin 60 and a stationary armature pin guide 25. The armature pin guide 25 guides the armature pin 24 during an opening and closing process.

Figure 2:
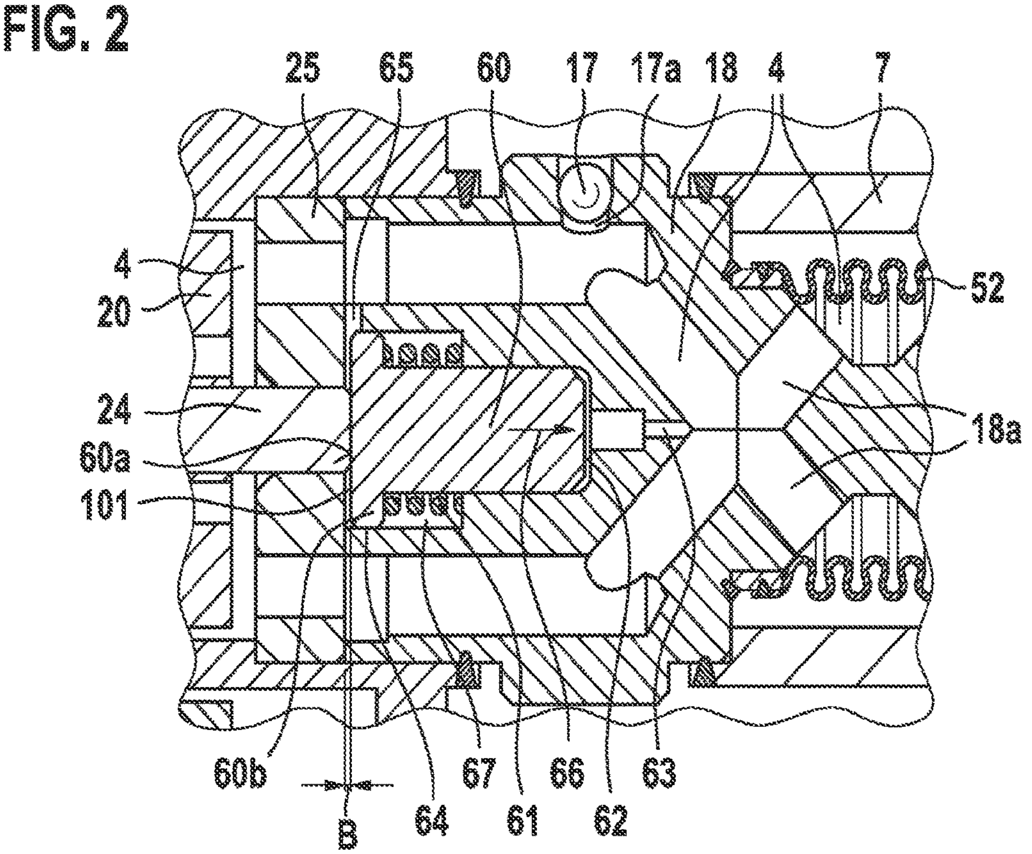
FIG. 2 is an enlarged schematic sectional view of part of the gas injector from FIG. 1.

As can also be seen from FIG. 2, the brake spring 61 is arranged between the brake pin 60 and the guide member 18. In this case, the brake pin 60 has a flange 60*b* that is provided with play in relation to the guide member 18. Moreover, there is provided in the guide member 18 a passage 65 which can be formed, for example, as a slot on the end of the guide member 18 pointing toward the armature pin guide 25. Thus, fluid communication out of the spring chamber 67 to the lubricant chamber 4, via the guide play 64 and the passage 65, can be provided for the lubricant.

Moreover, in the closed state, the first gap 101 is formed between the contact surface 60*a* of the brake pin 60 and the armature pin guide 25. In this case, the gap 101 has a first width B that is smaller than a second width C between the armature 20 and the internal pole 21 (cf. FIGS. 1 and 2) at the second gap 102. This ensures that a stroke of the brake pin 60, which is preloaded in the axial direction by the compression spring 61, is smaller than a stroke of the armature 20. As a result, during the injection process enough fluid can flow out of the lubricant chamber 4 into the damping chamber 62 via the choke 63.

During the closing process, the armature pin 24 strikes the contact surface 60*a* of the brake pin 60. The brake pin 60 is thus pushed against the fluid located in the damping chamber 62, as indicated by the arrow 66 in FIG. 2. Owing to the choke 63, the fluid cannot be pushed out of the damping chamber 62 immediately, but rather it is pushed out slowly so as to enable a damping action during the closing process. This prevents excessive wear occurring on the valve seat 11 and the armature 20 since the closing process is damped by the restoring of the brake pin 60.

Moreover, the damping process is assisted by the brake spring 61 and hydraulic adhesion of the brake pin 60 to the armature pin guide 25. In the process, the damping chamber 62 can prevent cavitation from occurring during the closing process in said region between the armature pin guide 25 and the contact surface 60*a* of the brake pin 60. The restoring process is also slowed down by the brake pin 60 rubbing in the guide member 18 and, in the lubricant chamber 4 as a whole, by the moving-component masses that are to be accelerated, which lead to displacement of the lubricant in the closed lubricant chamber and thus to additional braking during the closing process.

Selecting a diameter and/or a length of the choke 63 can adjust the damping behavior in a specific manner for each gas injector.

It should be noted that a stop surface between the damping pin 60 and the armature pin guide 25 can preferably be formed in a cuneiform manner, i.e., not at a right angle to a central axis X-X of the gas injector. Alternatively or additionally, radial slots can be provided in the contact surface 60*a* or in the end face of the armature pin guide 25 pointing toward the brake pin 60, thereby further reducing and preventing a cavitation effect.

In this case, the gas injector 1 shown in FIG. 1 is compressive force-balanced. In other words, the closure element 3 is connected to the valve body 9 by way of the first flexible sealing element 51, the first flexible sealing element 51, which is configured as a metal bellows, having an average diameter that is equal to a diameter at the valve seat 11 at which the closure element 3 provides sealing on the valve seat 11. As a result, there is no compressive force on the closure element 3, and so a magnetic force needed to open the closure element 3 can be kept very small and in particular is independent of a pressure of the gaseous fuel.

With the present invention, therefore, when the closure element 3 has been placed into the open state (movement of the closure element 3 to the left in FIG. 1) by actuating the solenoid actuator 2 and gas has been injected, reliable damping can be carried out during the restoring of the closure element 3, shortly before the closure element is pushed into the valve seat 11. In this case, the brake pin 60 is pushed in the direction of the damping chamber 62 by the armature pin 24 and thus only moves as slowly as the lubricant is pushed out of the damping chamber 62, through the choke 63, and into the lubricant chamber 4. A closure speed of the closure element 3 is thus significantly and effectively braked before the closure element strikes the valve seat 11. Consequently, wear on the valve seat 11 and the closure element 3 can be effectively reduced, the braking device 6 furthermore allowing the gas injector to be operated more easily. In addition, a so-called closure rebound, in which an element strikes strongly against a valve seat and bounces back, can be effectively prevented.

Figure 3:
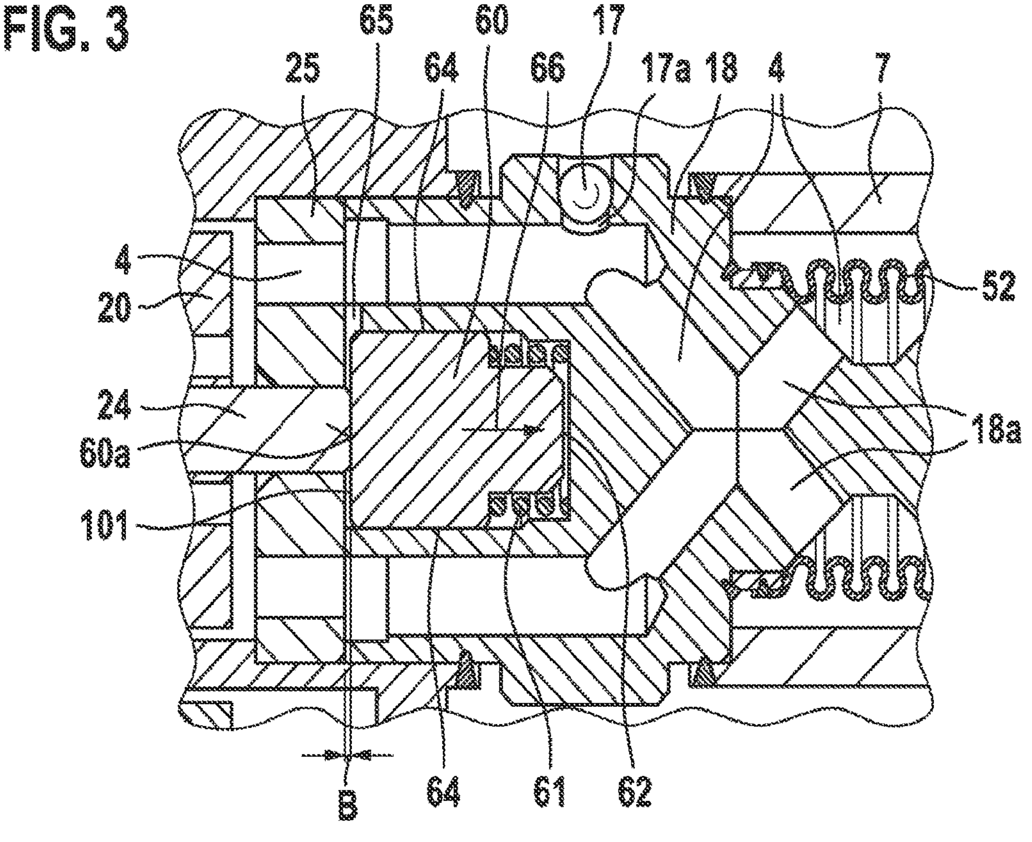
FIG. 3 is an enlarged schematic sectional view of part of a gas injector according to a second exemplary embodiment of the present invention.

FIG. 3 is a section through part of a gas injector according to a second exemplary embodiment of the present invention.

Identical or functionally identical parts are denoted by the same reference numerals as in the first exemplary embodiment.

FIG. 3 shows the braking device 6, which has a different configuration from that in the first exemplary embodiment. In the second exemplary embodiment, the damping chamber 62 is now connected to the lubricant chamber 4 not via a choke but via a guide play 64 between the brake pin 60 and the guide member 18. Communication with the lubricant chamber 4 is then ensured via one or more passages 65 formed in the radial direction on the end face of the guide member 18. In this case, the brake spring 61 is arranged in the damping chamber 62. As a result, an axial installation space for the braking device 6 can be reduced, meaning that the gas injector 1 as a whole can be formed to be shorter in the axial direction. In addition, a choke need not be provided as in the first exemplary embodiment. During a restoring process, therefore, the armature pin 24 pushes against the contact surface 60*a* of the brake pin 60 such that the brake pin is pushed toward the guide member 18 in the direction of the arrow 66. In the process, lubricant is pushed back out of the damping chamber 62 and into the lubricant chamber 4 via the guide play 64 and the at least one passage 65. A further advantage of the second exemplary embodiment is that there is a smaller volume of lubricant in the damping chamber 62. As a result, vibrations at the brake pin 60, which may result from an elasticity of the lubricant, can be lessened in particular.

Otherwise, the second exemplary embodiment corresponds to the first exemplary embodiment, and so reference should be made to the description in relation thereto.

Thus, the gas injector 1 as set out in detail in the two exemplary embodiments can provide reduced wear on the moving parts, in particular on the valve seat 11 and armature 20 and in the armature pin 24. Moreover, dissipation of heat from the solenoid actuator 2 can be considerably improved owing to the closed lubricant chamber 4 containing a liquid lubricant. Furthermore, the two flexible sealing elements 51, 52 can prevent undesirable forces from acting on the closure element 3.

What is claimed is:

1. A gas injector for injecting a gaseous fuel, comprising:

a solenoid actuator including an armature, an internal pole, and a coil;

a closure which opens and closes a gas path on a valve seat, wherein the armature is connected to the closure;

a closed lubricant chamber filled with a lubricant and in which the armature is arranged, wherein the lubricant ensures the armature is lubricated;

a flexible sealer which seals the lubricant chamber in relation to the gas path; and a braking device arranged in the lubricant chamber and configured to brake the closure during a process of restoring the gas injector from an open state into a closed state;

wherein the braking device includes a brake pin, a damping chamber that is filled with lubricant and is in fluid communication with the lubricant chamber, and a resilient brake, wherein the brake pin and the resilient brake can be operatively connected to the closure during the restoring process, and the brake pin is configured, during a process of restoring the gas injector, to displace lubricant out of the damping chamber into the lubricant chamber to damp the restoring of the closure into the closed state, wherein the brake pin includes a contact surface, which is arranged on a side of the brake pin pointing toward the closure, can be operatively connected to the closure, and is used as the stop surface for the brake pin.

2. The gas injector as recited in claim 1, wherein the resilient brake is arranged in the damping chamber.

3. The gas injector as recited in claim 1, wherein the damping chamber is in fluid communication with the lubricant chamber by way of a guide play of the brake pin.

4. The gas injector as recited in claim 1, further comprising a choke, wherein the damping chamber is in fluid communication with the lubricant chamber by way of the choke.

5. The gas injector as recited in claim 1, further comprising an armature pin which abuts the closure and is rigidly connected to the armature, wherein an end of the armature pin facing away from the valve seat of the gas injector abuts the brake pin when the gas injector is in the closed state.

6. The gas injector as recited in claim 5, further comprising an armature pin guide in which the armature pin is guided, wherein the armature pin guide is used as a stop for the brake pin when the injector is in the open state.

7. The gas injector as recited in claim 1, further comprising a guide member which is arranged in the lubricant chamber and is configured to guide the brake pin.

8. The gas injector as recited in claim 6, wherein, when the gas injector is in the closed state, a first gap between the brake pin and the armature pin guide has a first width that is smaller than a width of a second gap between the armature and the internal pole.

9. The gas injector as recited in claim 1, wherein: i) a restoring element restorer for restoring the closure is arranged in the lubricant chamber, and/or ii) a first guide region and a second guide region of the closure are arranged in the lubricant chamber.

* * * * *